Feb. 11, 1969   R. ESTES ET AL   3,426,819
BOLT WITH DEFORMABLE WASHER
Original Filed Sept. 4, 1964
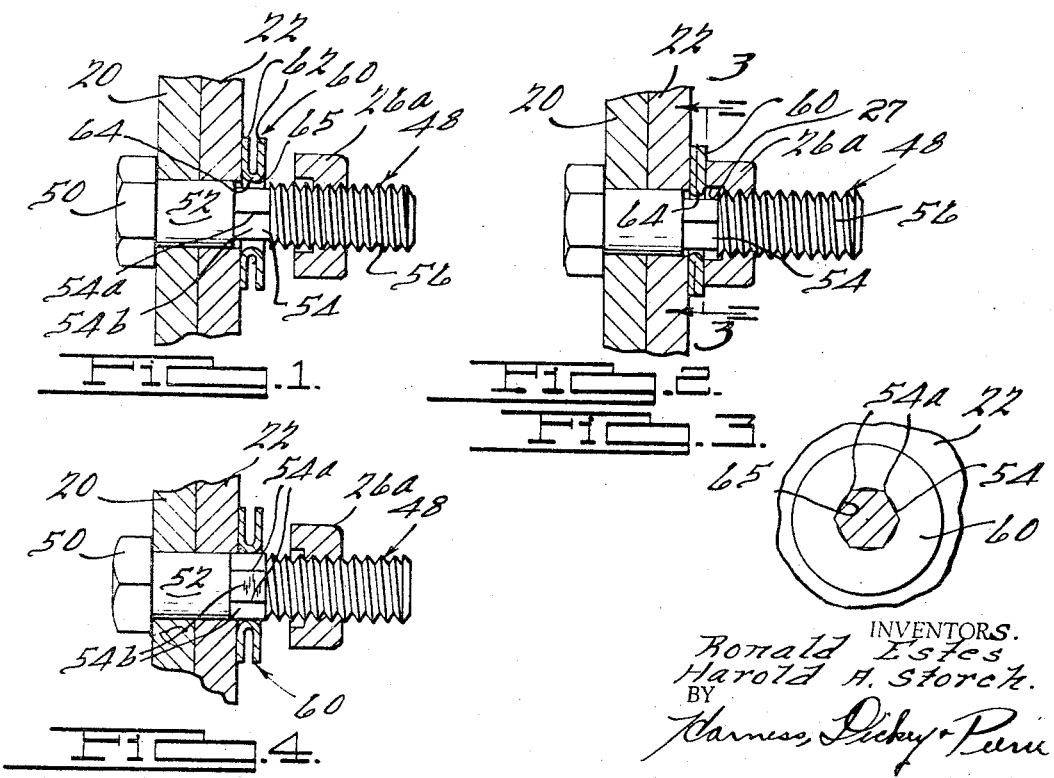
INVENTORS.
Ronald Estes
Harold A. Storch.
BY
Harness, Dickey & Pierce
ATTORNEYS.

United States Patent Office 3,426,819
Patented Feb. 11, 1969

3,426,819
BOLT WITH DEFORMABLE WASHER
Ronald Estes, Garden City, and Harold A. Storch, Birmingham, Mich., assignors to Federal Screw Works, Detroit, Mich., a corporation of Michigan
Continuation of application Ser. No. 394,443, Sept. 4, 1964. This application Feb. 20, 1967, Ser. No. 617,421
U.S. Cl. 151—69       2 Claims
Int. Cl. F16b 43/00, 29/00

ABSTRACT OF THE DISCLOSURE

A fastener assembly including a bolt having a head, a thread shank, and a non-circular locking portion intermediate the head and the thread. A deformable washer which is U-shaped in cross-section is deformed into non-rotatable locking engagement with the non-circular portion upon tightening down of a counterbored nut member.

This application is a continuation of application Ser. No. 394,443, filed Sept. 4, 1964, which is now abandoned.

This invention relates to fastener assemblies and particularly to a fastener assembly including a male threaded member, a lock nut, and a deformable washer adapted to be nonrotatably locked on the male threaded member upon the tightening of the nut.

It is an object of the present invention to provide a fastener assembly of the above character consisting of a male threaded member, a nut, and a washer in which the washer is deformed by application of the nut and is thereby permanently secured on the male threaded member so that the washer will serve to hold the fastened parts in assembly even if the nut comes off the male threaded member.

It is another object of the present invention to provide a fastener assembly of the above character in which the washer is held against rotation on the male threaded member and serves to insulate the nut from rotational forces produced by angular movement of one of the fastened parts.

It is still another object of the present invention to provide a fastener assembly of the above character in which the washer is automatically held in a centered position on the male threaded member during its deformation and will be so located on the male threaded member as to apply equal forces to the nut which is seated against it.

It is still another object of the present invention to provide a fastener assembly of the above character which lends itself to use with a self-locking nut and in which the washer assists in holding the nut against rotation.

It is still another object of the present invention to provide a fastener assembly which is reliable in use, inexpensive to manufacture, and well suited for its intended purpose. These and other objects of the present invention will become apparent from the following detailed description taken in conjunction with the accompanying drawings, wherein:

FIG. 1 is a sectional view taken through the bolt axis of a fastener assembly embodying the principles of the present invention, the assembly being shown partially applied to a pair of members to be fastened; and FIG. 2 is a view of the fastener assembly of FIG. 1 showing the assembly completely installed; and FIG. 3 is a sectional view of the structure illustrated in FIG. 2 taken along the line 2—2 thereof; and FIG. 4 is a sectional view of the structure shown in FIG. 1 with the bolt being rotated 30° from the position thereof shown in FIG. 1.

Referring now to the drawings, FIG. 1 shows a pair of members 20 and 22 to be held together, the members 20 and 22 being illustrated as generally flat sheets of material held in face to face abutting relationship and provided with aligned bolt-receiving apertures. A male threaded member in the form of a bolt 48 is illustrated as projecting through the members 20 and 22 and a nut 26a is shown threaded onto the bolt 48. A washer 60 is positioned on the bolt 48 between the nut 26a and the member 22. A head 50 of the bolt will be seen to engage the member 20 to permit tightening of the nut 26a against the washer 60. The bolt 48 is formed with a cylindrical shank portion 52 disposed within the members 20 and 22, a reduced diameter portion 54 of noncircular cross sectional shape and threads 56. The specific cross sectional shape of the bolt portion 54 is hexagonal and it will be seen to have axially extending edges 54a formed between flat surfaces 54b. As is best shown in FIG. 4, the edges 54a are disposed on a diameter equal to the crest diameter of the bolt threads 56.

The hexagonal bolt portion 54 is designed to receive the washer 60 which is made from sheet metal and is provided with two parallel walls 62 which are of annular shape and which are spaced apart in a direction axially of the bolt. The walls 62 are interconnected at their inner diameters by a bight portion 64 of U-shaped cross section, which defines an aperture 65 located centrally in the washer 60. The aperture 65 initially possesses a diameter slightly greater than or equal to the crest diameter of the threaded extremity 56 of the bolt. By this means the washer may be fitted onto the bolt by being slid over the threads 56 and onto the hexagonal portion 54. In this position the washer will be centered by the edges 54a so that it is disposed with its center substantially coincident with the axis of the bolt. The nut 26a can then be applied to the bolt. As the nut 26a is threaded down on the bolt threads 56, its inner face engages the outermost wall 62 and moves it toward the innermost wall closing the space between the two walls 62. When this happens, the bight portion 64 is deformed radially inwardly and the edges 54a dig into the bight portion deforming the aperture 65 from a circular to a noncircular shape. Thus, the edges 54a and the adjacent portions of the walls 54 prevent the washer 60 from rotating on the bolt. The portions of the aperture 65 which lie between the edges 54a will be located radially inwardly of the diameter on which the crest of the threads 56 are located. By this means the washer is provided with a portion which will engage the threads 56 to prevent the washer from coming off the bolt in the event of loss of the nut 26a from the assembly.

The nut 26a is provided with a counterbore 27 on the side adjacent the member 22 into which the hexagonal portion 54 may extend when the assembly is completely installed (FIGURE 2). This counterbore 27 clears the hexagonal portion 54 but nevertheless provides the necessary bearing engagement with the washer 60.

It will be appreciated that the various parts of the assemblies illustrated herein are adapted to be made from steel, but may also be made from other suitable materials. Furthermore, the bolt is designed to be made by the use of production cold forming equipment. Thus, the fastener assembly of the present invention may be manufactured at a relatively low cost, yet it will provide a highly reliable fastening, having marked safety features which lend it to use in critical applications.

The nut 26a, illustrated herein, is preferably of the prevailing torque type of locknut. Various locknuts of this type are well known in the industry and one, for example, is shown in Stover U.S. Patent No. 2,464,729. According to to a locknut of this type, the nut 26a is deformed at its end opposite from the counterbore 27 to provide a radially inwardly deformed thread portion operable to engage the bolt threads and prevent accidental or inadvertent rotation of the nut on the bolt. It will be noted that the washer is initially positioned on the bolt prior to is deformation in a centered condition. In other words, the aperture of the washer is centered with respect to the bolt axis prior to deforming contact with the nut. By this means, it is assured that the nut will deform the washer equally on all sides to set up equal stresses within the washer and prevent any eccentric loading of the nut.

What is claimed is:

1. A fastener assembly including a male threaded member having threads at one end thereof and a portion of noncircular hexagonal cross section located axially inwardly of said threads, said portion of noncircular hexagonel cross section having a minimum diameter less than the crest diameter of said threads and a plurality of relatively sharp edges lying on an imaginary cylinder located at the maximum diameter thereof, the spaces between said edges occupying a greater portion of said cylinder than said edges, a nut adapted to be threaded on said threads and a washer having an aperture and a deformable portion surrounding said aperture, said aperture being of a size and shape enabling said washer to be advanced freely past said threads onto said non-circular hexgonal cross-section portion, said deformable portion being deformable into the spaces between said edges upon the tighening of said nut thereagainst to reduce said aperture to a diameter less than the crest diameter of said threads and to cause said edges to dig into said deformable portion whereby said washer is prevented from rotating on and coming off of said reduced diameter portion.

2. A fastener assembly including a male threaded member having threads at one end thereof and a portion of noncircular cross section located axially inwardly of said threads, said portion of noncircular cross section having a minimum diameter less than the crest diameter of said threads and a plurality of relatively sharp edges lying on an imaginary cylinder located at the maximum diameter thereof, the spaces between said edges occupying a greater portion of said cylinder than said edges, a nut adapted to be threaded on said threads and a washer having an aperture and a deformable portion surrounding said aperture, said aperture being of a size and shape enabling said washer to be advanced freely past said threads onto said reduced diameter portion, said deformable portion being deformable into the spaces between said edges upon the tightening of said nut thereagainst to reduce said aperture to a diameter less than the crest diameter of said threads and to cause said edges to dig into said deformable portion whereby said washer is prevented from rotating on and coming off of said reduced diameter portion, said washer having a pair of parallel flat annular walls interconnected by an annular portion of U-shaped cross section located at the inner periphery thereof and defining said aperture.

References Cited

UNITED STATES PATENTS

| | | | |
|---|---|---|---|
| 293,295 | 2/1884 | Agnew | 151—2 |
| 858,191 | 6/1907 | Logan | 151—3 |
| 924,467 | 6/1909 | Humphrey | 151—3 |
| 2,470,927 | 5/1949 | Hale | 151—69 |
| 2,605,121 | 7/1952 | Ensinger | 151—68 |
| 2,955,885 | 10/1960 | Storch | 151—3 |
| 3,118,718 | 1/1964 | Babey | 151—69 |

FOREIGN PATENTS 774,574   5/1957   Great Britain.

MARION PARSONS, Jr., *Primary Examiner.*

U.S. Cl. X.R.

85—1